United States Patent
Peng

(10) Patent No.: US 9,510,409 B2
(45) Date of Patent: Nov. 29, 2016

(54) LIGHT EMITTING DIODE DRIVING SYSTEM WITH LIGHT SIGNALS CARRIED VIA POWER LINES

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 15/153,202

(22) Filed: May 12, 2016

(65) Prior Publication Data

US 2016/0262229 A1    Sep. 8, 2016

Related U.S. Application Data

(63) Continuation-in-part of application No. 14/626,533, filed on Feb. 19, 2015, now Pat. No. 9,380,662.

(51) Int. Cl.
*H05B 33/08* (2006.01)

(52) U.S. Cl.
CPC .................. *H05B 33/0815* (2013.01)

(58) Field of Classification Search
CPC .......... H05B 33/0815; H05B 33/0824; H05B 33/089; H05B 33/0887; H05B 37/02; Y02B 20/341; Y02B 20/342; Y02B 20/346; G09G 3/3406
USPC ............ 315/185 R, 287, 291, 294, 307, 308, 315/312, 360
See application file for complete search history.

(56) References Cited

U.S. PATENT DOCUMENTS

| | | | |
|---|---|---|---|
| 8,148,907 B2* | 4/2012 | Sadwick ............ | H05B 33/0815 315/246 |
| 8,446,106 B2* | 5/2013 | Lee ..................... | H05B 33/0815 315/185 R |
| 8,970,136 B2 | 3/2015 | Kikuchi et al. | |
| 9,095,019 B2* | 7/2015 | Chen .................. | H05B 33/0806 |
| 9,380,662 B1* | 6/2016 | Peng .................. | H05B 33/0815 |
| 9,408,273 B2* | 8/2016 | Wee ................... | H05B 33/0854 |
| 2012/0074866 A1 | 3/2012 | Zhang et al. | |
| 2012/0223649 A1 | 9/2012 | Saes et al. | |
| 2013/0241433 A1 | 9/2013 | Ge et al. | |
| 2014/0265908 A1 | 9/2014 | Su et al. | |

* cited by examiner

*Primary Examiner* — Haissa Philogene
(74) *Attorney, Agent, or Firm* — Muncy, Geissler, Olds & Lowe, P.C.

(57) ABSTRACT

A light emitting diode driving system is applied to a light emitting diode lamp string, such that the light signal is carried through a power line to reduce the signal transmission lines. The light emitting diode driving system includes a switch unit, a control unit and a light signal generating unit. The switch unit includes a power input side, a power output side and a controlled side. The power output side is electrically connected to the light emitting diode lamp string. The control unit is electrically connected to the switch unit. The light signal generating unit is electrically connected to the control unit and the power output side. The light signal generating unit generates a light signal when the control unit turns off the switch unit. The light signal generating unit sends the light signal to the light emitting diode lamp string.

8 Claims, 4 Drawing Sheets

LIGHT EMITTING DIODE DRIVING SYSTEM WITH LIGHT SIGNALS CARRIED VIA POWER LINES

CROSS REFERENCE TO RELATED APPLICATION

This application is a Continuation-in-Part of co-pending application Ser. No. 14/626,533, filed on Feb. 19, 2015. The entire contents of which are hereby incorporated by reference.

BACKGROUND OF THE INVENTION

Field of the Invention

The present invention relates to a light emitting diode driving system, and especially relates to a light emitting diode driving system with light signals carried via power lines.

Description of the Related Art

Nowadays, the connection types of the light emitting diode lamp string modules are separated into two types: the serial-type connection and the parallel-type connection. The light emitting diode lamp string modules are widely used for external walls of the building, decoration of trees, signboards, and scenery designing.

In the related art serial-type light emitting diode lamp string modules, a plurality of light emitting diode lamp string modules are commonly connected in series. Also, the amount of the light emitting diode lamp string modules is determined according to the volume of the decorated objects. In addition, all of the light emitting diode lamp string modules are controlled by the same controller which initially controls the first light emitting diode lamp string module.

Although the light emitting diode lamp string modules are easily connected together, the remaining light emitting diode lamp string modules behind the abnormal light emitting diode lamp string module cannot be lighted even only one of the light emitting diode lamp string modules is abnormal. That is because the control signal cannot be sent to drive all of the remaining light emitting diode lamp string modules.

The parallel-type light emitting diode lamp string modules are connected to the controller in parallel. Accordingly, each one of the light emitting diode lamp string modules is controlled by the controller through a control line and an address line, respectively. For example, ten control lines and ten address lines need to be used when ten light emitting diode lamp string modules are employed to be connected in parallel.

The remaining light emitting diode lamp string modules can still be normally controlled when one of the light emitting diode lamp string modules is abnormal. However, the amount of the control lines and the address lines increase proportionally. Therefore, complexity and the costs of the equipment also increase when the amount of the light emitting diode lamp string modules increases.

No matter the connection type of the light emitting diode lamp string modules is the serial-type or the parallel-type, many power transmission lines and signal transmission lines need to be used to control the colors and intensities of the light emitting diode lamp string modules. Accordingly, cost down can be achieved only if the amount of the power transmission lines or the signal transmission lines can be reduced.

Moreover, the related art control unit utilizes the voltage drop of the related art resistor as the driving voltage. However, because the input voltage is high, the temperature of the related art resistor is very high and dangerous.

SUMMARY OF THE INVENTION

In order to solve the above-mentioned problems, an object of the present invention is to provide a light emitting diode driving system with light signals carried via power lines.

In order to achieve the object of the present invention mentioned above, the light emitting diode driving system is applied to a light emitting diode lamp string. The light emitting diode driving system comprises a switch unit, a control unit, a light signal generating unit and a controlling side Zener diode. The switch unit comprises a power input side, a power output side and a controlled side. The power output side is electrically connected to the light emitting diode lamp string. The control unit is electrically connected to the switch unit. The light signal generating unit is electrically connected to the control unit and the power output side. The controlling side Zener diode is electrically connected to the control unit and supplies power to the control unit. The controlling side Zener diode, the switch unit and the light emitting diode lamp string are connected in series. The light signal generating unit generates the light signal when the control unit turns off the switch unit. The light signal generating unit sends the light signal to the light emitting diode lamp string.

Moreover, in an embodiment, the light signal generating unit comprises a voltage-dividing resistor, a signal generating side Zener diode, a signal generating side capacitor and a signal generating side diode. The voltage-dividing resistor is electrically connected to the control unit. The signal generating side Zener diode is electrically connected to the voltage-dividing resistor. The signal generating side capacitor is electrically connected to the voltage-dividing resistor. The signal generating side diode is electrically connected to the voltage-dividing resistor and the power output side.

Moreover, in an embodiment, the light emitting diode driving system further comprises a controlling side capacitor and a first transistor. The controlling side capacitor is electrically connected to the control unit and the controlling side Zener diode. The first transistor is electrically connected to the control unit.

Moreover, in an embodiment, the light emitting diode driving system further comprises a first resistor, a first capacitor and a second resistor. The first resistor is electrically connected to the control unit. The first capacitor is electrically connected to the control unit. The second resistor is electrically connected to the first transistor.

Moreover, in an embodiment, the light emitting diode driving system further comprises an alternating-current-to-direct-current converter electrically connected to the control unit.

Moreover, in an embodiment, the light emitting diode driving system further comprises a first connector electrically connected to the light emitting diode lamp string and the switch unit.

Moreover, in an embodiment, the light emitting diode driving system further comprises a second connector electrically connected to the first connector.

Moreover, in an embodiment, the light emitting diode driving system further comprises a Zener diode electrically connected to the light emitting diode lamp string and the switch unit.

The advantage of the present invention is that the light signal is carried through the power line to reduce the signal transmission lines. Moreover, the controlling side Zener diode replaces the related art resistor to supply power to the control unit.

DETAILED DESCRIPTION OF THE INVENTION

Please refer to following detailed description and figures for the technical content of the present invention. The following detailed description and figures are referred for the present invention, but the present invention is not limited to it.

Figure 1:
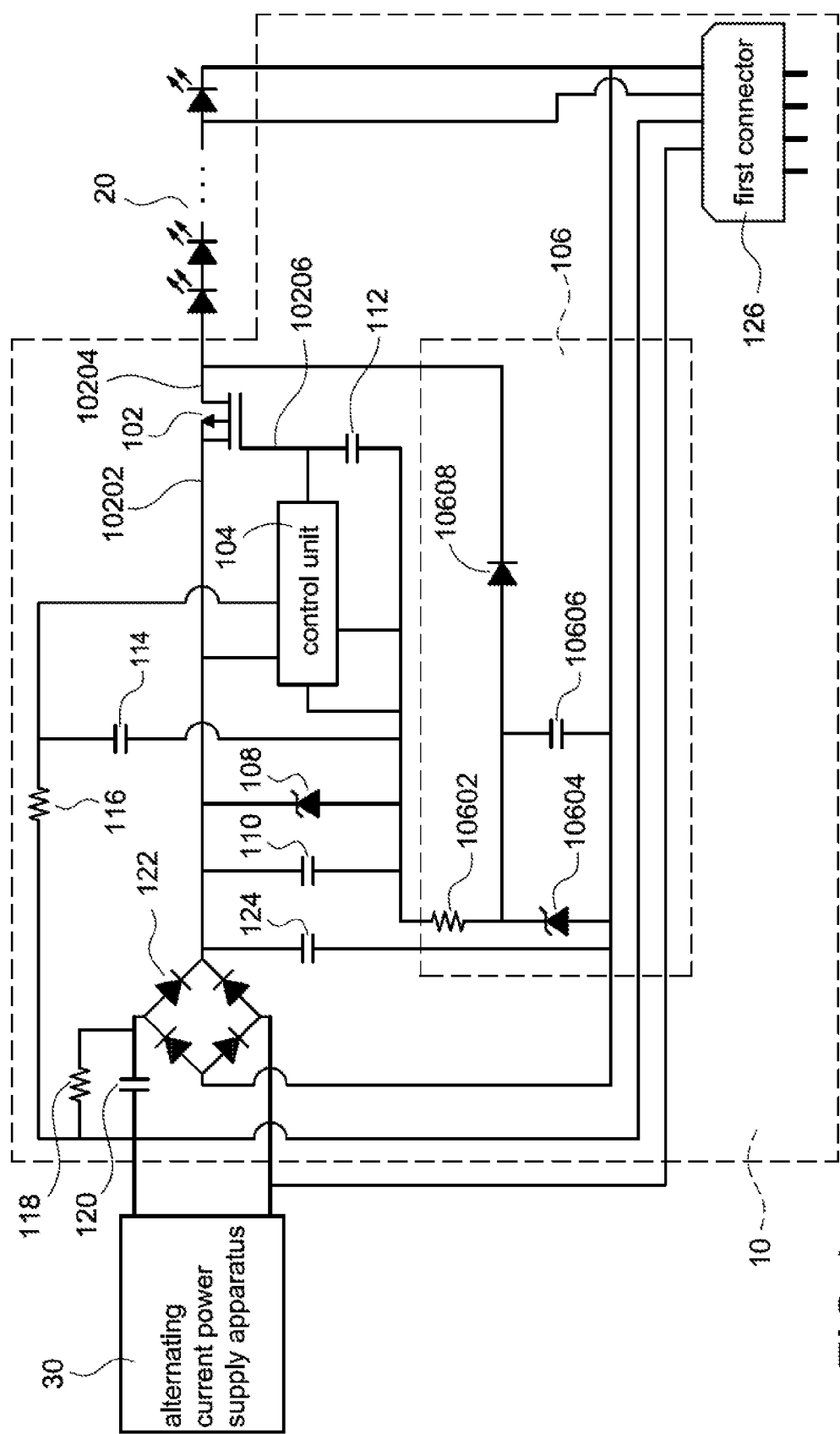
FIG. 1 shows a block diagram of the first embodiment of the light emitting diode driving system of the present invention.

FIG. 1 shows a block diagram of the first embodiment of the light emitting diode driving system of the present invention. A light emitting diode driving system 10 with light signals carried via power lines is applied to a light emitting diode lamp string 20 and an alternating current power supply apparatus 30. The light emitting diode driving system 10 comprises a switch unit 102, a control unit 104, a light signal generating unit 106, a Zener diode 108, a first capacitor 110, a second capacitor 112, a third capacitor 114, a first resistor 116, a bridge side resistor 118, a load capacitor 120, a bridge rectifier 122, a filtering capacitor 124 and a first connector 126.

The switch unit 102 comprises a power input side 10202, a power output side 10204 and a controlled side 10206. The light signal generating unit 106 comprises a voltage-dividing resistor 10602, a signal generating side Zener diode 10604, a signal generating side capacitor 10606 and a signal generating side diode 10608.

The power output side 10204 is electrically connected to the light emitting diode lamp string 20. The control unit 104 is electrically connected to the switch unit 102. The light signal generating unit 106 is electrically connected to the control unit 104 and the power output side 10204. The Zener diode 108 is electrically connected to the control unit 104. The first capacitor 110 is electrically connected to the control unit 104. The second capacitor 112 is electrically connected to the control unit 104 and the controlled side 10206. The third capacitor 114 is electrically connected to the control unit 104. The first resistor 116 is electrically connected to the third capacitor 114. The bridge side resistor 118 is electrically connected to the first resistor 116. The load capacitor 120 is electrically connected to the bridge side resistor 118. The bridge rectifier 122 is electrically connected to the control unit 104 and the power input side 10202. The filtering capacitor 124 is electrically connected to the control unit 104 and the power input side 10202. The first connector 126 is electrically connected to the light emitting diode lamp string 20, the alternating current power supply apparatus 30, the bridge rectifier 122, the first resistor 116 and the bridge side resistor 118. The voltage-dividing resistor 10602 is electrically connected to the control unit 104. The signal generating side Zener diode 10604 is electrically connected to the voltage-dividing resistor 10602. The signal generating side capacitor 10606 is electrically connected to the voltage-dividing resistor 10602. The signal generating side diode 10608 is electrically connected to the voltage-dividing resistor 10602 and the power output side 10204.

The light signal generating unit 106 generates the light signal when the control unit 104 turns off the switch unit 102. The light signal generating unit 106 sends the light signal to the light emitting diode lamp string 20. The light emitting diode lamp string 20 comprises a plurality of two-pin point-controlled lights.

Figure 2:
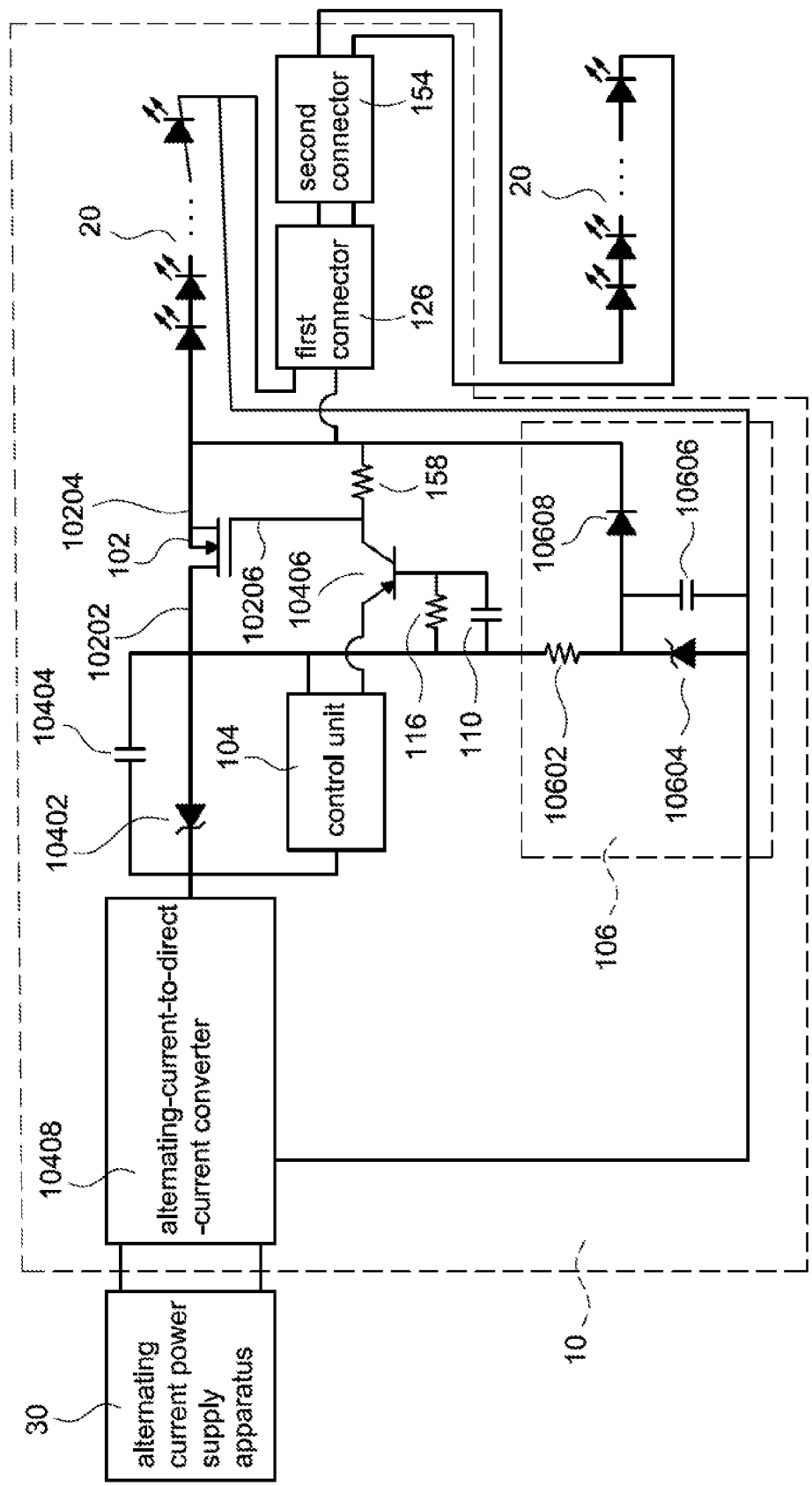
FIG. 2 shows a block diagram of the second embodiment of the light emitting diode driving system of the present invention.

FIG. 2 shows a block diagram of the second embodiment of the light emitting diode driving system of the present invention. The description for the elements shown in FIG. 2, which are similar to those shown in FIG. 1, is not repeated here for brevity. Moreover, the light emitting diode driving system 10 further comprises a controlling side Zener diode 10402, a controlling side capacitor 10404, a first transistor 10406, a first resistor 116, a first capacitor 110, a second resistor 158, an alternating-current-to-direct-current converter 10408, a first connector 126 and a second connector 154.

The controlling side Zener diode 10402 is electrically connected to the control unit 104 and supplies power to the control unit 104. The controlling side capacitor 10404 is electrically connected to the control unit 104 and the controlling side Zener diode 10402. The first transistor 10406 is electrically connected to the control unit 104. The first resistor 116 is electrically connected to the control unit 104. The first capacitor 110 is electrically connected to the control unit 104. The second resistor 158 is electrically connected to the first transistor 10406. The alternating-current-to-direct-current converter 10408 is electrically connected to the control unit 104. The first connector 126 is electrically connected to the light emitting diode lamp string 20 and the switch unit 102. The second connector 154 is electrically connected to the first connector 126. The switch unit 102 shown in FIG. 2 is an N-MOSFET.

Moreover, the alternating-current-to-direct-current converter 10408, the controlling side Zener diode 10402, the switch unit 102 and the light emitting diode lamp string 20 are connected in series. The control unit 104, the controlling side Zener diode 10402 and the controlling side capacitor 10404 are connected in parallel.

Figure 3:
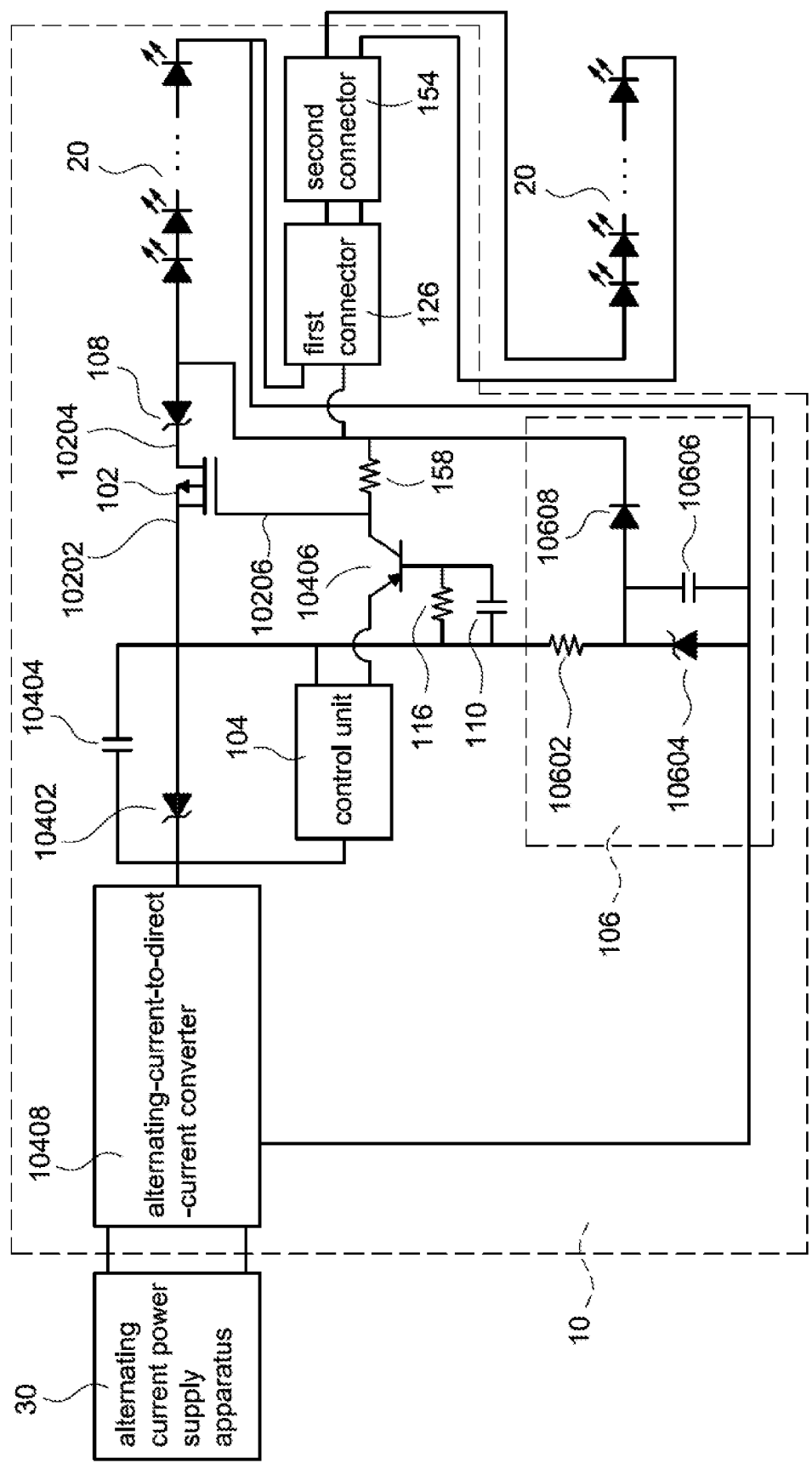
FIG. 3 shows a block diagram of the third embodiment of the light emitting diode driving system of the present invention.

FIG. 3 shows a block diagram of the third embodiment of the light emitting diode driving system of the present invention. The description for the elements shown in FIG. 3, which are similar to those shown in FIG. 1, is not repeated here for brevity. Moreover, the light emitting diode driving system 10 further comprises a controlling side Zener diode 10402, a controlling side capacitor 10404, a first transistor 10406, a first resistor 116, a first capacitor 110, a second resistor 158, an alternating-current-to-direct-current converter 10408, a first connector 126, a second connector 154 and a Zener diode 108.

The controlling side Zener diode 10402 is electrically connected to the control unit 104 and supplies power to the control unit 104. The controlling side capacitor 10404 is electrically connected to the control unit 104 and the controlling side Zener diode 10402. The first transistor 10406 is electrically connected to the control unit 104. The first resistor 116 is electrically connected to the control unit 104. The first capacitor 110 is electrically connected to the control unit 104. The second resistor 158 is electrically connected to the first transistor 10406. The alternating-current-to-direct-current converter 10408 is electrically connected to the control unit 104. The first connector 126 is electrically connected to the light emitting diode lamp string 20 and the switch unit 102. The second connector 154 is electrically connected to the first connector 126. The Zener diode 108 is electrically connected to the light emitting diode lamp string 20 and the switch unit 102. The switch unit 102 shown in FIG. 3 is a P-MOSFET.

Moreover, the alternating-current-to-direct-current converter 10408, the controlling side Zener diode 10402, the switch unit 102, the Zener diode 108 and the light emitting diode lamp string 20 are connected in series. The control unit 104, the controlling side Zener diode 10402 and the controlling side capacitor 10404 are connected in parallel.

Figure 4:
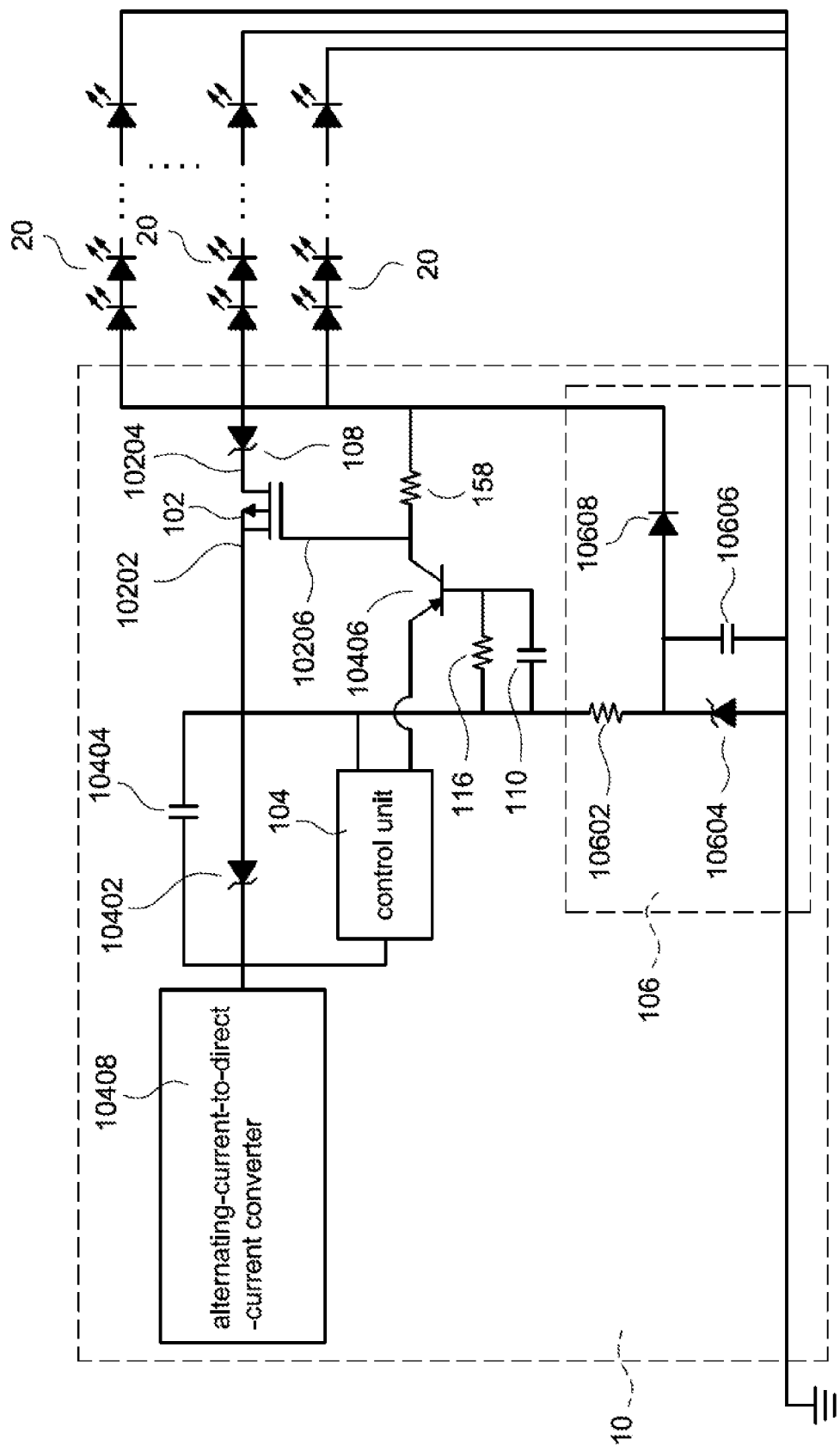
FIG. 4 shows a block diagram of the fourth embodiment of the light emitting diode driving system of the present invention.

FIG. 4 shows a block diagram of the fourth embodiment of the light emitting diode driving system of the present invention. The description for the elements shown in FIG. 4, which are similar to those shown in FIG. 1, FIG. 2 and FIG. 3, is not repeated here for brevity.

The advantage of the present invention is that the light signal is carried through the power line to reduce the signal transmission lines. Moreover, the controlling side Zener diode 10402 replaces the related art resistor to supply power to the control unit 104. The method for fetching power for the control unit 104 of the present invention is that the controlling side Zener diode 10402 is connected to the light emitting diode lamp string 20 in series. The voltage is divided by the controlling side Zener diode 10402 and the light emitting diode lamp string 20, so that there is no temperature problem. The present invention utilizes the cathode reverse connection characters of the controlling side Zener diode 10402 and utilizes the reverse breakdown voltage, so that the driving voltage of the control unit 104 is supplied by reducing the original input high voltage. Namely, the present invention utilizes the stable voltage and current characters of the controlling side Zener diode 10402 to solve the conventional high temperature problem.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting diode driving system with light signals carried via power lines applied to a light emitting diode lamp string, the light emitting diode driving system comprising:
    a switch unit comprising a power input side, a power output side and a controlled side, the power output side electrically connected to the light emitting diode lamp string;
    a control unit electrically connected to the switch unit;
    a light signal generating unit electrically connected to the control unit and the power output side; and
    a controlling side zener diode electrically connected to the control unit and supplying power to the control unit,
    wherein the controlling side zener diode, the switch unit and the light emitting diode lamp string are connected in series; the light signal generating unit generates the light signal when the control unit turns off the switch unit; the light signal generating unit sends the light signal to the light emitting diode lamp string.

2. The light emitting diode driving system in claim 1, wherein the light signal generating unit comprises:
    a voltage-dividing resistor electrically connected to the control unit;
    a signal generating side zener diode electrically connected to the voltage-dividing resistor;
    a signal generating side capacitor electrically connected to the voltage-dividing resistor; and
    a signal generating side diode electrically connected to the voltage-dividing resistor and the power output side.

3. The light emitting diode driving system in claim 1 further comprising:
    a controlling side capacitor electrically connected to the control unit and the controlling side zener diode; and
    a first transistor electrically connected to the control unit.

4. The light emitting diode driving system in claim 3 further comprising:
    a first resistor electrically connected to the control unit;
    a first capacitor electrically connected to the control unit; and
    a second resistor electrically connected to the first transistor.

5. The light emitting diode driving system in claim 4 further comprising:
    an alternating-current-to-direct-current converter electrically connected to the control unit,
    wherein the alternating-current-to-direct-current converter, the controlling side zener diode, the switch unit and the light emitting diode lamp string are connected in series.

6. The light emitting diode driving system in claim 5 further comprising:
    a first connector electrically connected to the light emitting diode lamp string and the switch unit.

7. The light emitting diode driving system in claim 6 further comprising:
    a second connector electrically connected to the first connector.

8. The light emitting diode driving system in claim 7 further comprising:
    a zener diode electrically connected to the light emitting diode lamp string and the switch unit.

\* \* \* \* \*